(12) United States Patent
Duale (10) Patent No.: US 9,311,049 B2
(45) Date of Patent: Apr. 12, 2016

(54) SYSTEM TO IMPROVE NUMEREICAL CONVERSIONS AND ASSOCIATED METHODS

(75) Inventor: Ali Y. Duale, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1201 days.

(21) Appl. No.: 12/638,136

(22) Filed: Dec. 15, 2009

(65) Prior Publication Data

US 2011/0145308 A1 Jun. 16, 2011

(51) Int. Cl.
*G06F 7/38* (2006.01)
*G06F 7/483* (2006.01)

(52) U.S. Cl.
CPC .................................... *G06F 7/483* (2013.01)

(58) Field of Classification Search
None
See application file for complete search history.

(56) References Cited

U.S. PATENT DOCUMENTS

| | | | | |
|---|---|---|---|---|
| 5,161,117 A | * | 11/1992 | Waggener, Jr. | 708/204 |
| 5,889,980 A | * | 3/1999 | Smith, Jr. | 712/222 |
| 5,960,201 A | * | 9/1999 | Ma et al. | 717/154 |
| 6,263,426 B1 | | 7/2001 | Abdallah et al. | 712/229 |
| 6,337,648 B1 | * | 1/2002 | Kiriaki | 341/154 |
| 6,535,898 B1 | | 3/2003 | Yuval | 708/204 |
| 6,671,796 B1 | | 12/2003 | Sudharsanan et al. | 712/222 |

OTHER PUBLICATIONS

Aaron Smith et al., "Compiling for EDGE Architectures", Proceedings of the International Symposium on Code Generation and Optimization (CGO '06), pp. 1-11 (2006).
IBM et al., "Latching Branch Instruction Signals and Queuing Target Instructions", IBM Technical Disclosure Bulletin, vol. 35, No. 6, pp. 425-426 (Nov. 1992).
Ajay Naini et al., "1-GHz HAL SPARC64 Dual Floating Point Unit with RAS Features", 0-7695-1150-3/01 IEEE, pp. 173-183 (2001).

* cited by examiner

*Primary Examiner* — Ilwoo Park
(74) *Attorney, Agent, or Firm* — Steven Chiu (57) ABSTRACT

A system to improve numerical conversion may include a data processor and a controller configured to convert a floating-point number from the data processor to more than one different floating-point type number. The conversion may enable the selection of the more than one different floating-point type number that satisfies the requirements of an executing application and/or is closest to the original number.

20 Claims, 10 Drawing Sheets

|  | BFP Short | BFP Long | BFP Extended | HFP Short | HFP Long | HFP Extended | DFP Short | DFP Long | DFP Extended |
|---|---|---|---|---|---|---|---|---|---|
| BFP Short |  |  |  | ok | ok | ok | ok | ok | ok |
| BFP Long | O/U |  |  | O/U | O/U | O/U | O/U | ok | ok |
| BFP Ext | O/U | ok |  | O/U | O/U | O/U | O/U | O/U | ok |
| HFP Short | O/U | ok | ok |  |  |  | ok | ok | ok |
| HFP Long | O/U | ok | ok |  |  |  | ok | ok | ok |
| HFP Ext | O/U | ok | ok |  |  |  | ok | ok | ok |
| DFP Short | O/U | ok | ok | O/U | O/U | O/U |  |  |  |
| DFP Long | O/U | O/U | ok | O/U | O/U | O/U |  |  |  |
| DFP Ext | O/U | O/U | O/U | O/U | O/U | O/U |  |  |  |

FIG. 11

SYSTEM TO IMPROVE NUMEREICAL CONVERSIONS AND ASSOCIATED METHODS

BACKGROUND OF THE INVENTION

1. Field of the Invention

The invention relates to the field of computer systems, and, more particularly, to a system to improve numerical conversion in such.

2. Description of Background

The Institute of Electrical and Electronics Engineers 754 floating standard definition of Decimal Floating-Points may have prompted the need for instructions(s) that convert between two different types of floating points (i.e., binary, hexadecimal, and decimal). One instruction called Perform Floating-Point operations ("PFPO") may do such conversions. The PFPO instruction may attempt to convert different formats (short, long, or extended) of a floating-point data type to a specific format of a different floating-point type. For example, a short Binary Floating-Point ("BFP") number may be converted to a short, long, or extended Decimal Floating-Point ("DFP") number.

Hexadecimal is base 16 and has a fixed exponent length. Binary is base 2, and has more precision than hexadecimal. Binary's short, long, and extended formats have different exponent length. Decimal is base 10 and has the highest precision. Decimal suites well with financial applications and has recently been implemented in hardware (fast).

SUMMARY OF THE INVENTION

According to one embodiment of the invention, a system to improve numerical conversion may include a data processor and a controller configured to convert an original floating-point number from the data processor to more than one different floating-point type number. The conversion may enable the selection of the more than one different floating-point type number that satisfies the requirements of an executing application and/or is closest to the original floating-point number.

The system may further comprise a plurality of registers carried by the data processor to store the more than one different floating-point type number conversions. The controller and/or a user may select the more than one different floating-point type.

The more than one different floating-point target conversion may be selected prior to conversion, during conversion, and/or after conversion. The controller may execute internal and/or external to the data processor.

The more than one different floating-point target conversion of floating-point number may comprise a binary floating-point type number, a decimal floating-point type number, and/or a hexadecimal floating-point type number. The binary floating-point type number may comprise a short format, a long format, and/or an extended format. The decimal floating-point type number may comprise a short format, a long format, and/or an extended format. The hexadecimal floating-point type number may comprise a short format, a long format, and/or an extended format.

The controller and/or a user may select the short format, the long format, and/or the extended format for the binary floating-point type, the decimal floating-point type, and/or the hexadecimal floating-point type. The short format, the long format, and/or the extended format may be selected prior to conversion, during conversion, and/or after conversion.

Another aspect of the invention is a method to improve numerical conversion. The method may include configuring an automated controller to convert an original floating-point number to more than one different floating-point format of a different floating point type. The method may also include selecting the more than one different floating-point type number that satisfies the requirements of an executing application and/or is closest to the original floating-point number.

The method may further include selecting the more than one different floating-point type number via the controller and/or a user. The method may additionally include selecting the more than one different floating-point type number to be a binary floating-point type, a decimal floating-point type, and/or a hexadecimal floating-point type.

The method may further include selecting the binary floating-point type to be a short format, a long format, and/or an extended format, the decimal floating-point type to be a short format, a long format, and/or an extended format, and the hexadecimal floating-point type to be a short format, a long format, and/or an extended format. The method may additionally include selecting the short format, the long format, and/or the extended format for the binary floating-point type, the decimal floating-point type, and/or the hexadecimal floating-point type via the controller and/or a user. The method may further include selecting the short format, the long format, and/or the extended format prior to conversion, during conversion, and/or after conversion.

Another aspect of the invention is a computer program product to improve numerical conversions. The computer program product may include a computer readable storage medium having computer readable program code embodied therewith, the computer readable program code comprising computer readable program code configured to configure an automated controller to convert an original floating-point number to more than one different floating-point format of a different floating-point type. The computer readable program code may also be configured to select the more than one different floating-point target format that satisfies the requirements of an executing application and/or is closest to the original floating-point number.

Another embodiment of a system to improve numerical conversion may include a data processor and a controller configured to convert one of a binary floating-point type number, a decimal floating-point type number, and a hexadecimal floating-point type number from the data processor to the other two floating-point type numbers based upon such selection being able to satisfy the requirements of an executing application and/or be closest to the original number.

The binary floating-point type number may comprise a short format, a long format, and/or an extended format. The decimal floating-point type number may comprise a short format, a long format, and/or an extended format. The hexadecimal floating-point type number may comprise a short format, a long format, and/or an extended format.

The controller and/or a user may select the short format, the long format, and/or the extended format for the binary floating-point type number, the decimal floating-point type number, and/or the hexadecimal floating-point type number to satisfy the requirements of an executing application and/or be closest to the original number. The short format, the long format, and/or the extended format may be selected prior to conversion, during conversion, and/or after conversion.

DETAILED DESCRIPTION OF THE INVENTION

The invention will now be described more fully hereinafter with reference to the accompanying drawings, in which preferred embodiments of the invention are shown, and where like numbers refer to like elements throughout.

Figure 1:
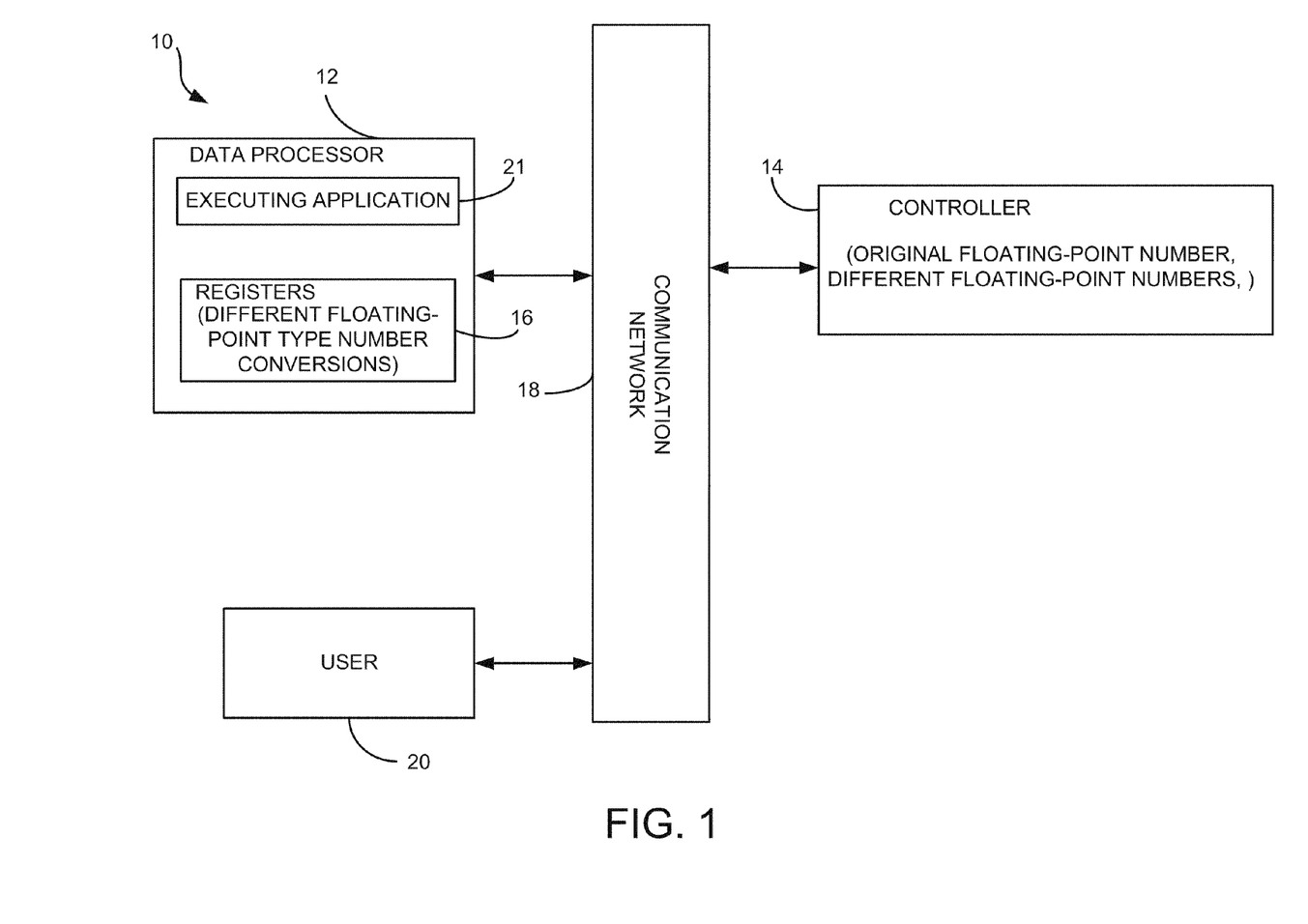
FIG. 1 is a schematic block diagram of a system to improve numerical conversions in accordance with the invention.

With reference now to FIG. 1, a system 10 to numerical conversions is initially described. According to one embodiment, the system 10 includes a data processor 12. The data processor 12 is a computer, signal processing circuitry, and/or the like, for instance. The system 10 also includes a controller 14 and the controller is implemented in software, firmware, hardware, and/or the like. The controller 14 is configured to convert an original floating-point number from the data processor 12 to more than one different floating-point type number. The conversion enables the selection of the more than one different floating-point type number, which satisfies the requirements of an executing application 21 and/or is closest to the original floating-point number. For example, the executing application 21 is a program running on the data processor 12.

In one embodiment, the system 10 includes a plurality of registers 16 carried by the data processor 12 to store the converted floating-point number to more than one different floating-point format of the target type. In another embodiment, the system 10 includes a communication network 18 connecting the data processor 12, the controller 14, the plurality of registers 16, and/or the like. In one embodiment, the communication network 18 enables a signal to travel anywhere within system 10 and/or to any other system connected to system 10. The communication network 18 is wired and/or wireless, for example. The communications network 18 is local and/or global with respect to system 10, for instance.

In one embodiment, the controller 14 and/or a user 20 selects the more than one different floating-point target format conversion. In another embodiment, the more than one different floating-point type is selected prior to conversion, during conversion, and/or after conversion. In another embodiment, the controller 14 executes internal and/or external to the data processor 12.

In one embodiment, the more than one different floating-point format conversion comprises a binary floating-point type number, a decimal floating-point type number, and/or a hexadecimal floating-point type number. In another embodiment, the binary floating-point type number comprises a short format, a long format, and/or an extended format. In another embodiment, the decimal floating-point type number comprises a short format, a long format, and/or an extended format. In another embodiment, the hexadecimal floating-point type number comprises a short format, a long format, and/or an extended format.

In one embodiment, the controller 14 and/or the user 20 selects the short format, the long format, and/or the extended format for the binary floating-point type, the decimal floating-point type, and/or the hexadecimal floating-point type. In another embodiment, the short format, the long format, and/or the extended format is selected prior to conversion, during conversion, and/or after conversion of the floating-point number from the data processor 12 to the more than one different floating-point type number.

Figure 2:
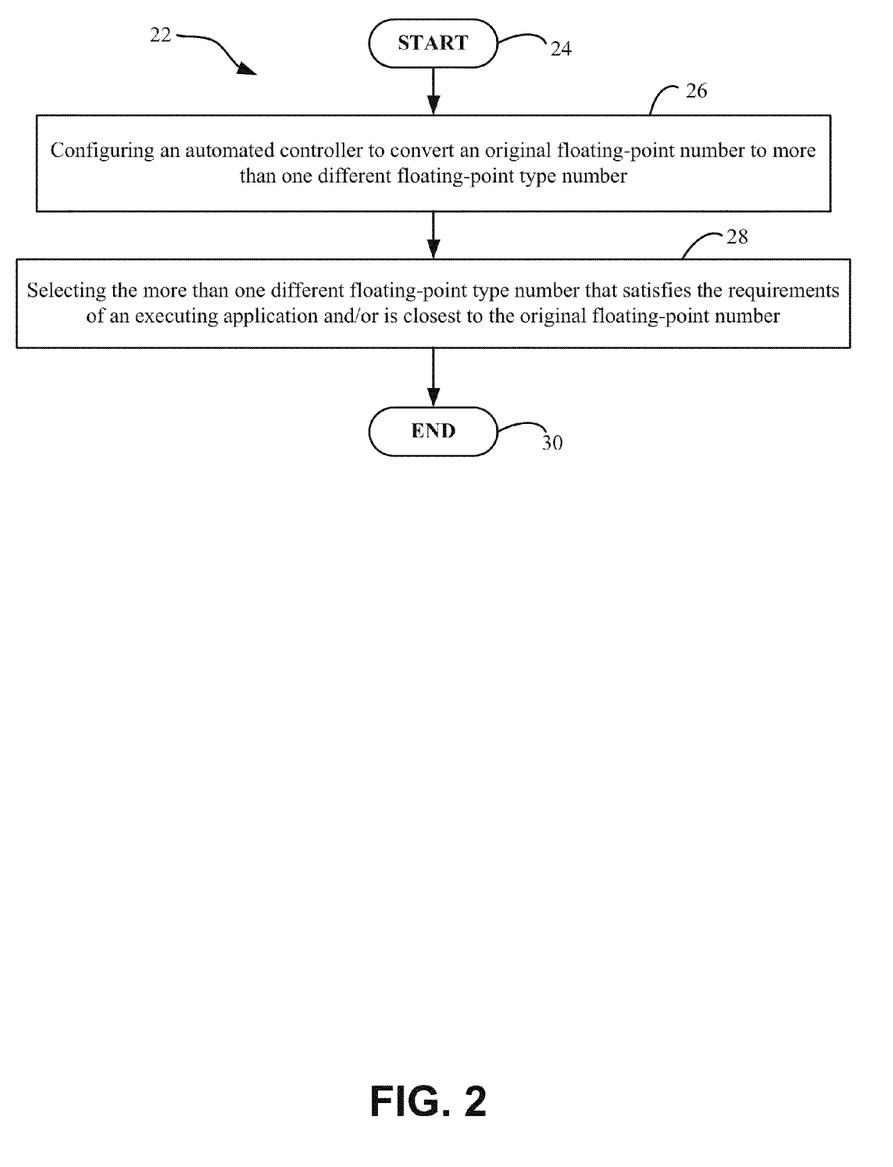
FIG. 2 is a flowchart illustrating method aspects according to the invention.

Another aspect of the invention is a method to improve numerical conversion, which is now described with reference to flowchart 22 of FIG. 2. The method begins at Block 24 and includes configuring an automated controller to convert an original floating-point number to more than one different floating-point format of the target type at Block 26. The method also includes selecting the more than one different floating-point type number that satisfies the requirements of an executing application and/or is closest to the original floating-point number at Block 28. The method ends at Block 30.

Figure 3:
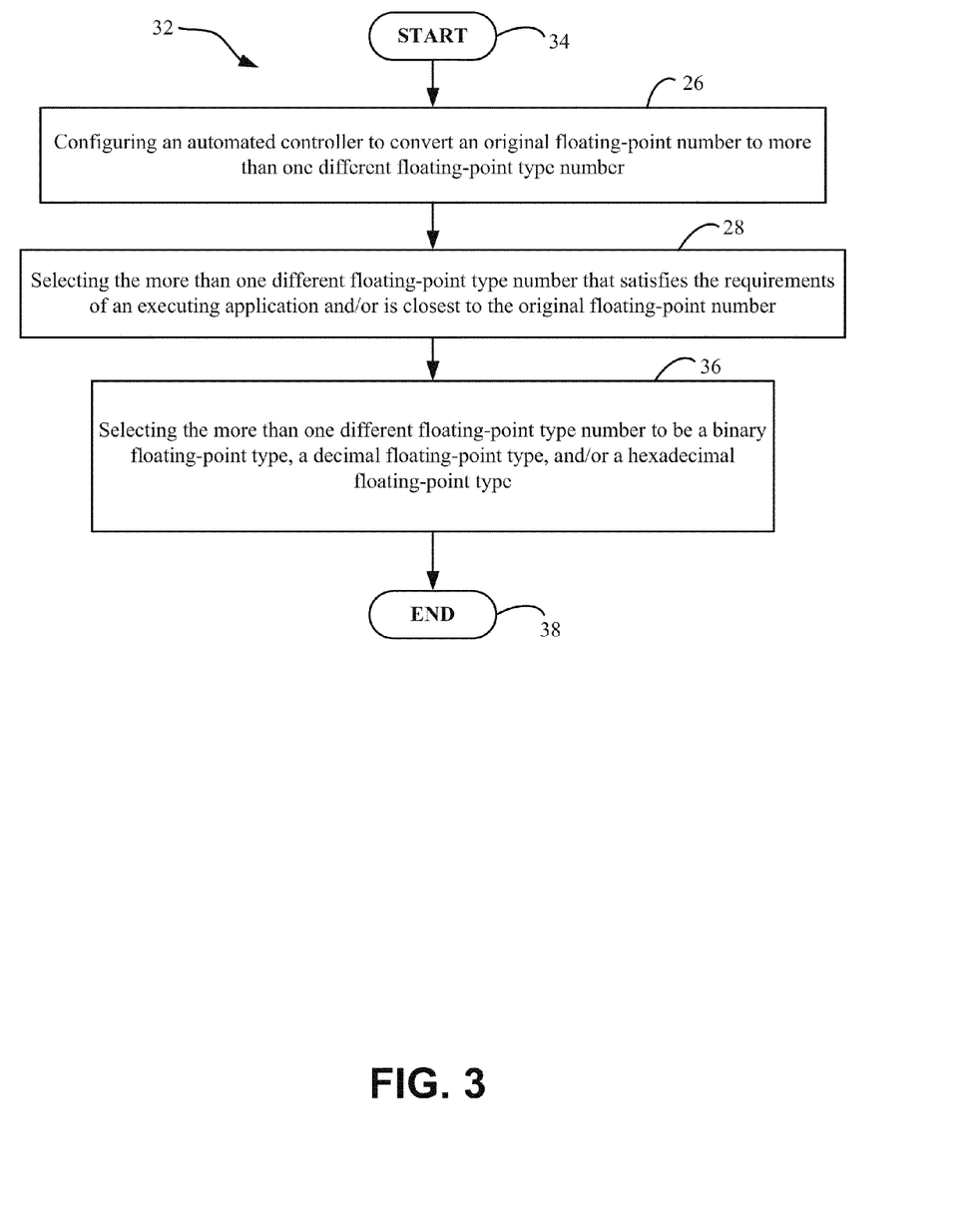
FIG. 3 is a flowchart illustrating method aspects according to the method of FIG. 2.

In another method embodiment, which is now described with reference to flowchart 32 of FIG. 3, the method begins at Block 34. The method may include the steps of FIG. 2 at Blocks 26 and 28. The method may additionally include selecting the more than one different floating-point type number via the controller and/or a user at Block 36. The method ends at Block 38.

Figure 4:
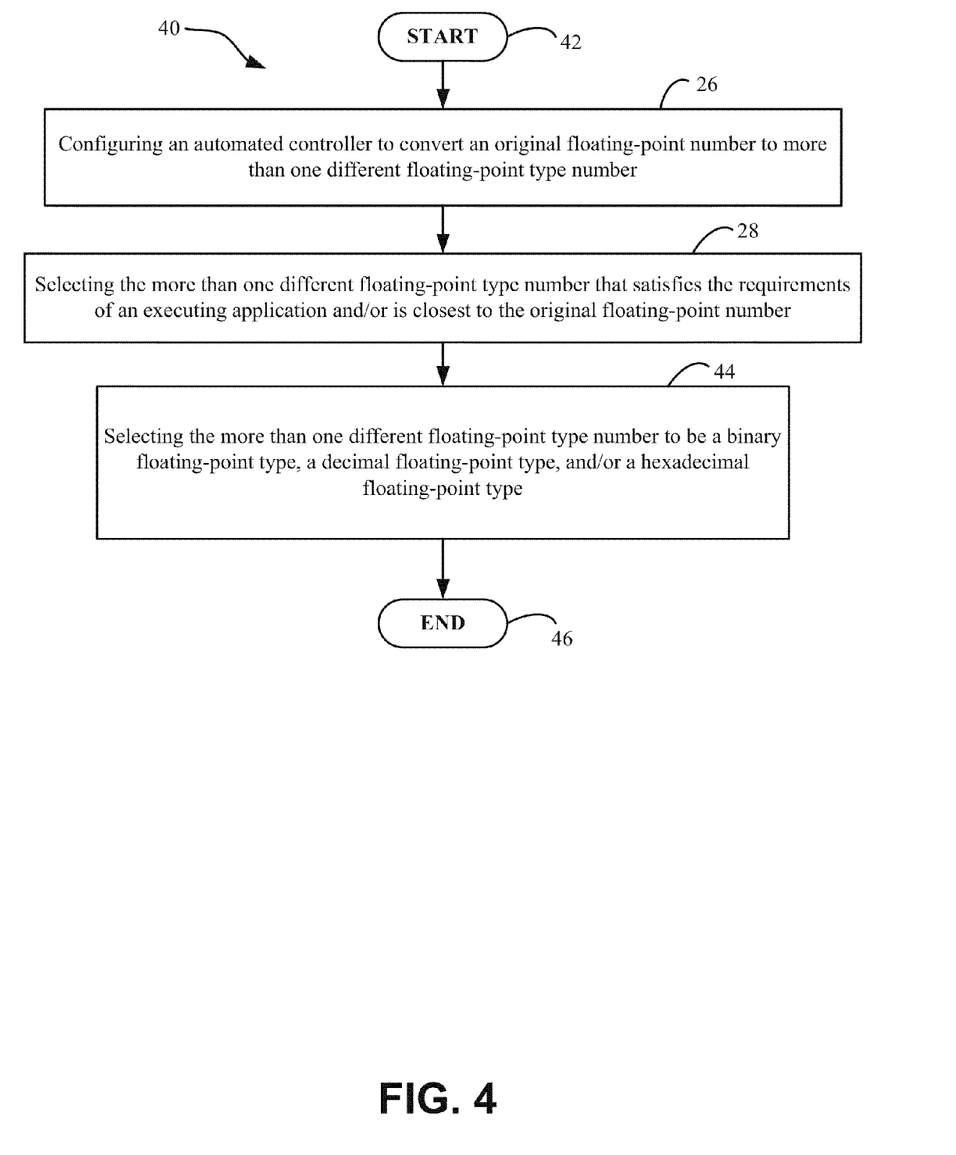
FIG. 4 is a flowchart illustrating method aspects according to the method of FIG. 2.

In another method embodiment, which is now described with reference to flowchart 40 of FIG. 4, the method begins at Block 42. The method may include the steps of FIG. 2 at Blocks 26 and 28. The method may additionally include selecting the more than one different floating-point type number to be a binary floating-point type, a decimal floating-point type, and/or a hexadecimal floating-point type at Block 44. The method ends at Block 46.

Figure 5:
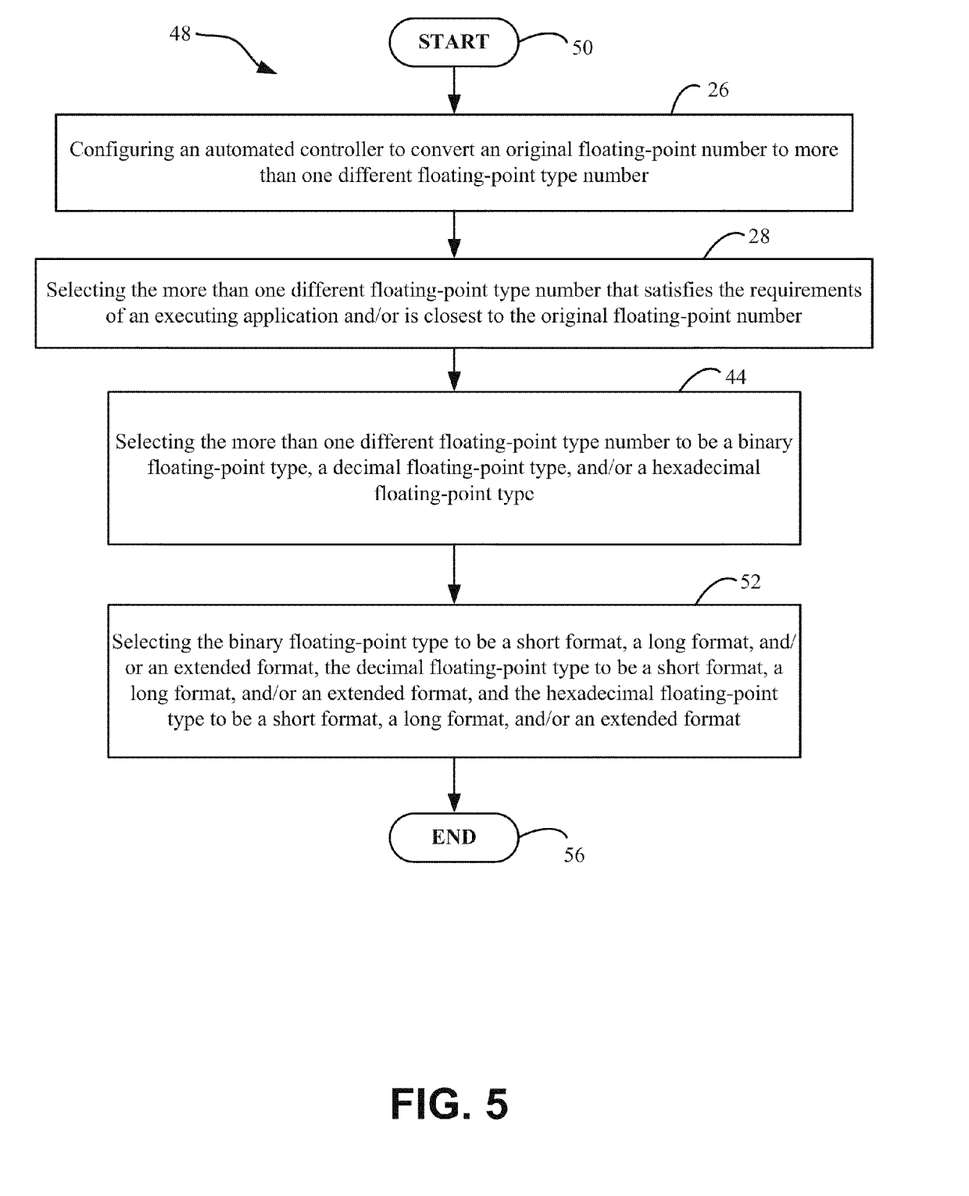
FIG. 5 is a flowchart illustrating method aspects according to the method of FIG. 4.

In another method embodiment, which is now described with reference to flowchart 48 of FIG. 5, the method begins at Block 50. The method may include the steps of FIG. 4 at Blocks 26, 28, and 44. The method may additionally include selecting the binary floating-point type to be a short format, a long format, and/or an extended format, the decimal floating-point type to be a short format, a long format, and/or an extended format, and the hexadecimal floating-point type to be a short format, a long format, and/or an extended format at Block 52. The method ends at Block 54.

Figure 6:
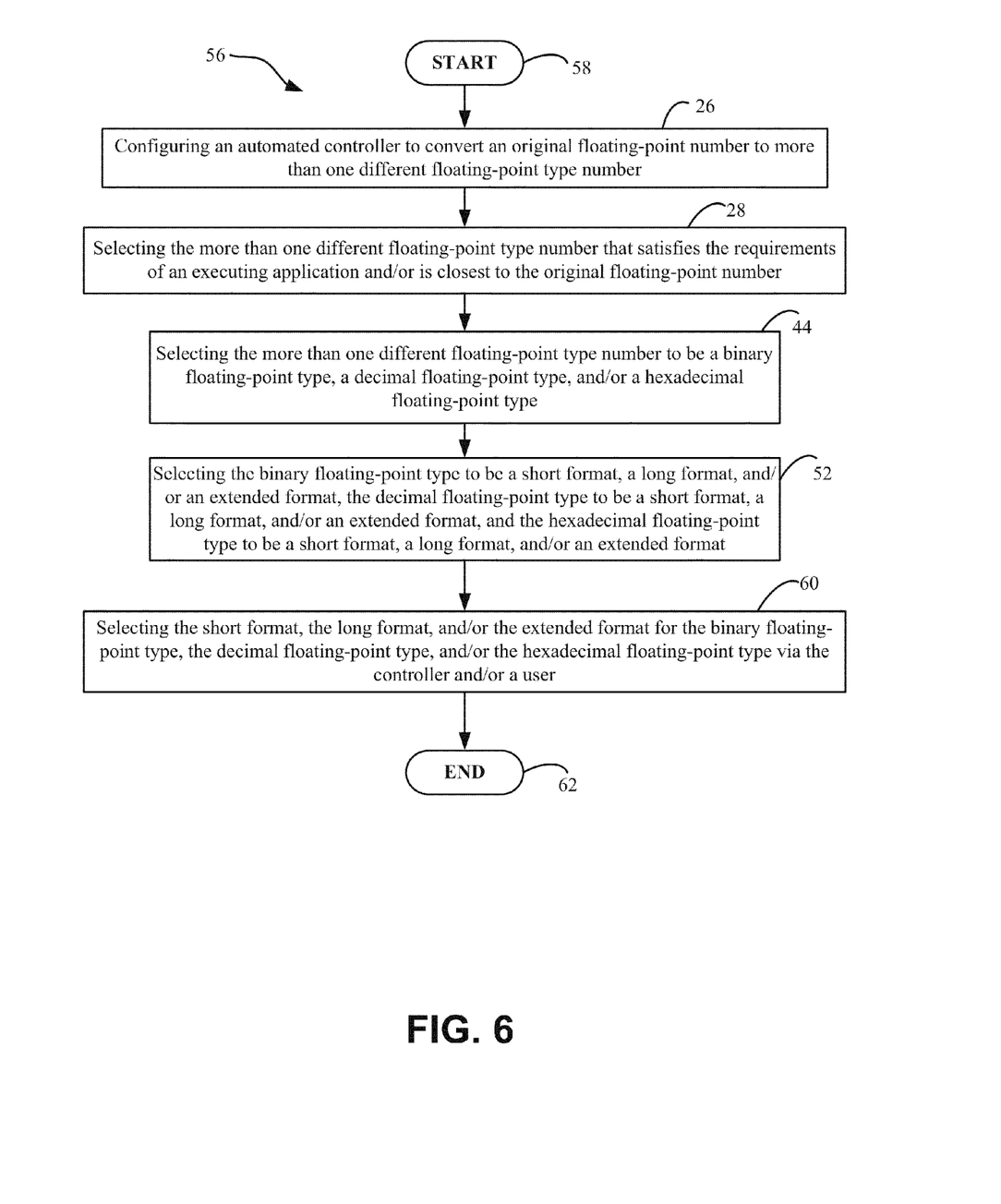
FIG. 6 is a flowchart illustrating method aspects according to the method of FIG. 5.

In another method embodiment, which is now described with reference to flowchart 56 of FIG. 6, the method begins at Block 58. The method may include the steps of FIG. 5 at Blocks 26, 28, 44, and 52. The method may additionally include selecting the short format, the long format, and/or the extended format for the binary floating-point type, the decimal floating-point type, and/or the hexadecimal floating-point type via the controller and/or a user at Block 60. The method ends at Block 62.

Figure 7:
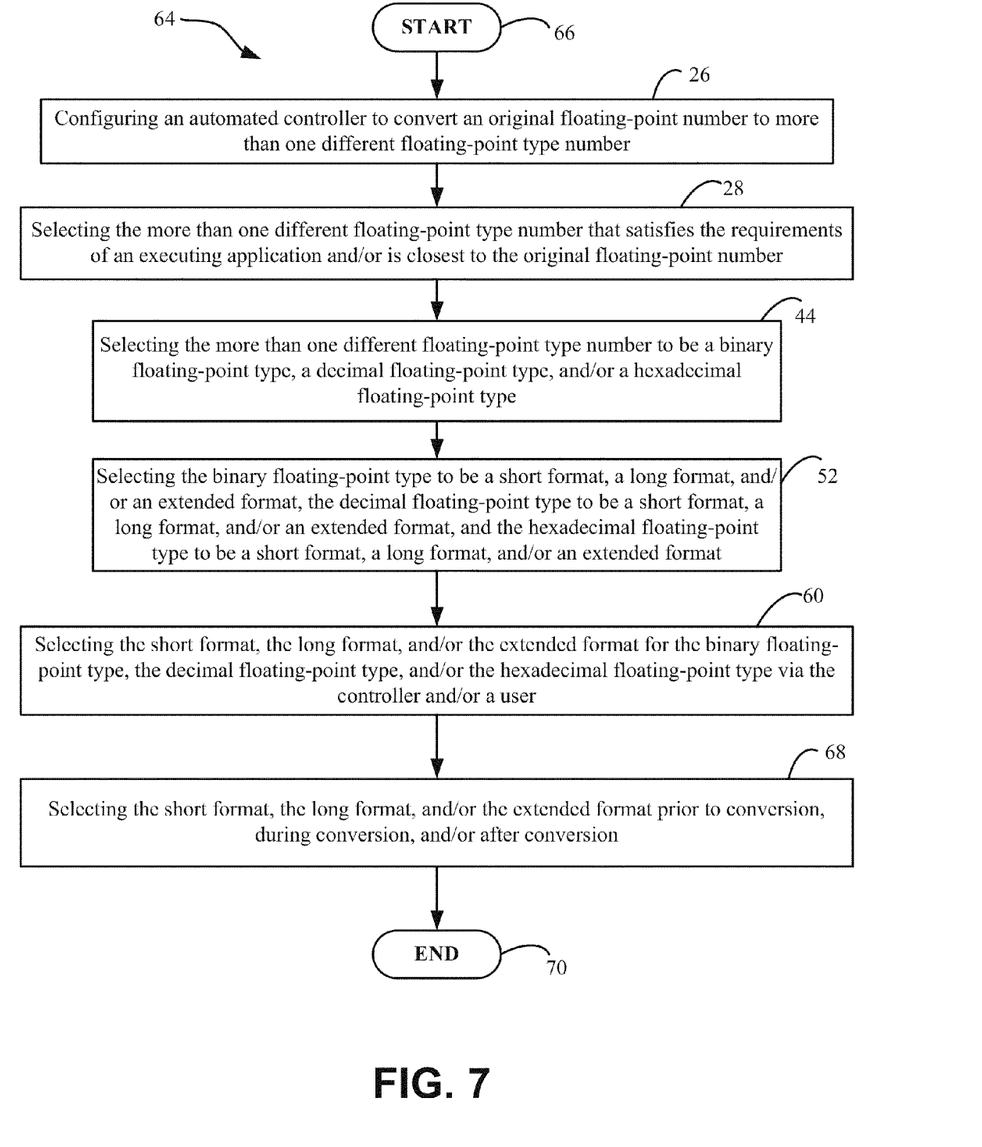
FIG. 7 is a flowchart illustrating method aspects according to the method of FIG. 6.

In another method embodiment, which is now described with reference to flowchart 64 of FIG. 7, the method begins at Block 66. The method may include the steps of FIG. 6 at Blocks 26, 28, 44, 52, and 60. The method may additionally include selecting the short format, the long format, and/or the extended format prior to conversion, during conversion, and/or after conversion at Block 68. The method ends at Block 70.

Another aspect of the invention is a computer program product to improve numerical conversions. In one embodiment, the computer program product include a computer readable storage medium having computer readable program code embodied therewith, the computer readable program code comprising computer readable program code configured to configure an automated controller 14 to convert an original floating-point number to more than one different floating-point type number. The computer readable program code may also be configured to select the more than one different floating-point type number that satisfies the requirements of an executing application 21 and/or is closest to the original floating-point number.

Another embodiment of the system 10 to improve numerical conversions includes a data processor 12 and a controller 14 configured to convert one of a binary floating-point type number, a decimal floating-point type number, and a hexadecimal floating-point type number from the data processor to the other two floating-point type numbers based upon such selection being able to satisfy the requirements of an executing application and/or be closest to the original number. In one embodiment, the binary floating-point type number comprises a short format, a long format, and/or an extended format. In another embodiment, the decimal floating-point type number comprises a short format, a long format, and/or an extended format. In another embodiment, the hexadecimal floating-point type number comprises a short format, a long format, and/or an extended format.

In one embodiment, the controller 14 and/or a user 20 select the short format, the long format, and/or the extended format for the binary floating-point type number, the decimal floating-point type number, and/or the hexadecimal floating-point type number to satisfy the requirements of an executing application and/or be closest to the original number. In another embodiment, the short format, the long format, and/or the extended format are selected prior to conversion, during conversion, and/or after conversion.

In view of the foregoing, the system 10 improves numerical conversions. For instance, the PFPO instruction can, depending on the target format, produce overflow or underflow. As an example, a short DFP number may cause overflow if the target format is the BFP format while the result may fit into a BFP long or extended format.

In one embodiment, system 10 provides an instruction/method that converts a given floating point type to all three formats of the target type. In another embodiment, the user 20 will then select from the three possible outputs formats that fit their requirement.

As mentioned earlier, current floating-point conversion methods, such as PFPO, produce a single format of a target floating-point type from a given format of a source floating-point type. For example, a BFP short may converted to DFP long, where the source type is BFP and the source format is short while the target type is DFP and the target format is long. A good percentage of such conversions wind up in overflow/underflow of the target format. System 10 minimizes efforts wasted on generating floating-point results with little or no use to the software.

For example, system 10 makes available to the software, e.g. executing application, all possible target formats that a given floating-point number of a given type would convert to. Such multiple values indicate different representations of the original floating-point number. For example, the above BFP short to DFP conversion could produce all three formats of the DFP type (short, long, and extended). Therefore, executing applications will have the ability to select the format that is closer to the original number and/or the format that satisfies applications' constraints or requirements.

Figure 8:
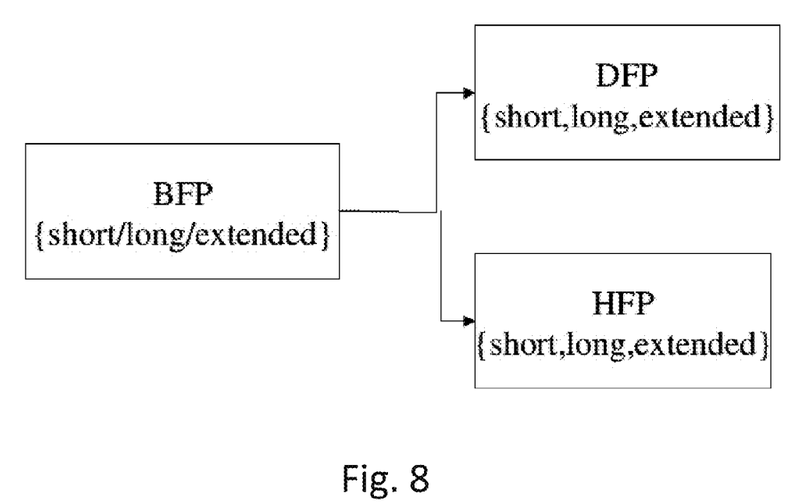
FIG. 8 is a flowchart illustrating BFP conversion to DFP and/or HFP in accordance with FIG. 1.
Figure 9:
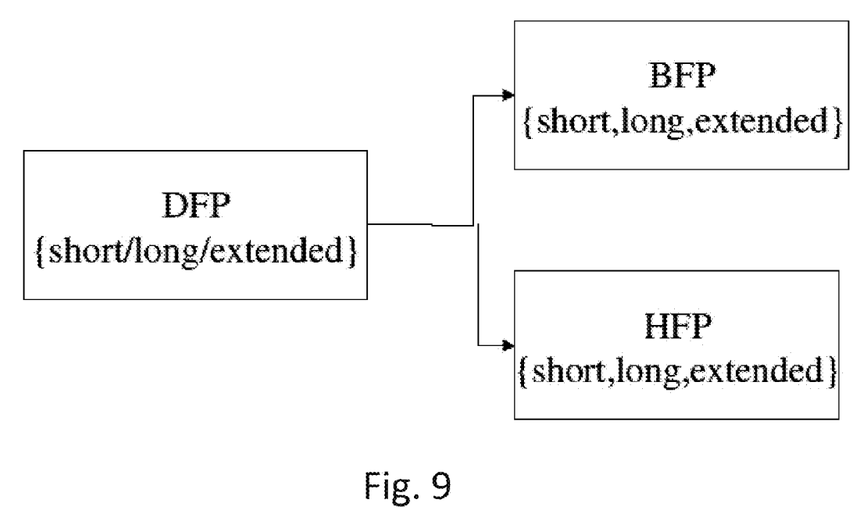
FIG. 9 is a flowchart illustrating DFP conversion to BFP and/or HFP in accordance with FIG. 1.
Figure 10:
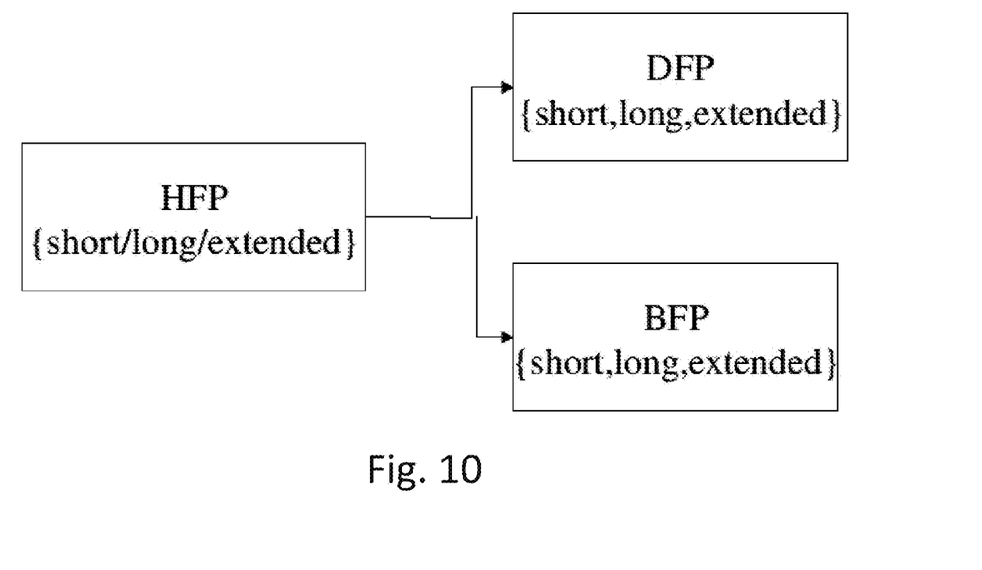
FIG. 10 is a flowchart illustrating HFP conversion to BFP and/or DFP in accordance with FIG. 1.

In one embodiment, when a floating-point number is to be converted from one type to another, system 10 produces all three formats of the target type rather than producing a single format. For instance, FIGS. 8-10 illustrate resulting formats when BFP, DFP, and Hexadecimal Floating-Point ("HFP") are converted, respectively. For example, a short format of BFP number is converted to short, long, and extended format of DFP type, and a similar operation is done when BFP is to be converted to HFP, and so on.

Figure 11:
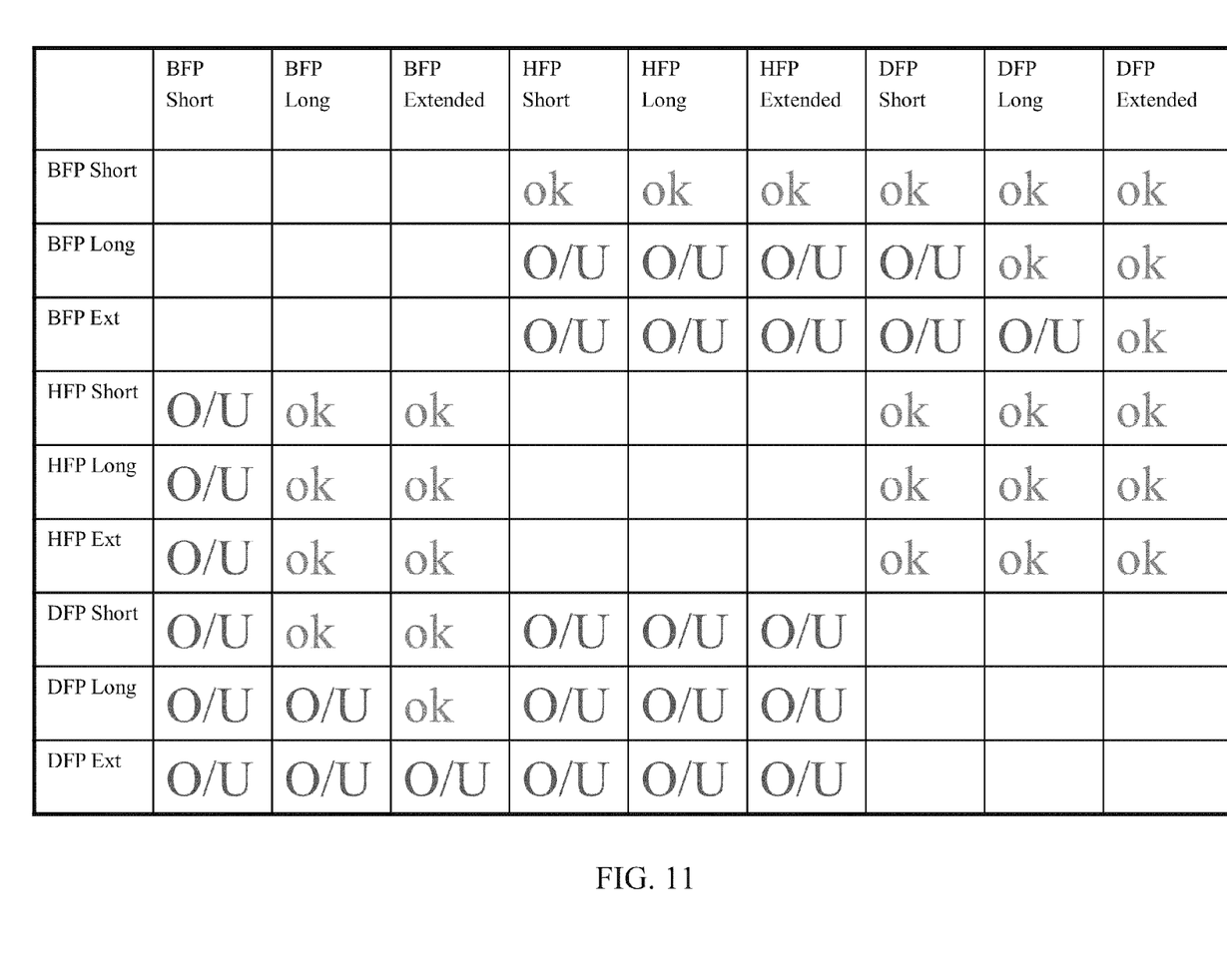
FIG. 11 is a chart of floating point conversions based on min/max values in accordance with FIG. 1.

With additional reference to FIG. 11, which illustrates overflow/underflow ("O/U") possibilities. For example, PFPO usually converts to only one format of the target format and many of the outputs are exception cases resulting in overflow/overflow. Such except cases mostly lead to useless data as far as the application is concerned. Consequently, the pardon is on the application to know if result fits into the target.

Accordingly, system 10 provides for improved floating point conversions. System 10 enables old applications to take advantage of newer DFP capabilities, and applications can indirectly invoke DFP hardware. It is noted that PFPO converts any format of a floating point type data to any of the other two floating point types.

The system 10 modifies the PFPO output processing and generates other potential output values when possible. The system 10 allows the software to select outputs non overflow/underflow outputs when present and desired. The system 10 repackages the output when more than one output is to be presented.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
  a data processor;
  an executing application; and
  a controller configured to convert an original floating-point number from the data processor to more than one different floating-point type number and present the more than one different floating-point type number to the executing application; and
  wherein the executing application selects one of the more than one different floating-point type number that at least one of satisfies the requirements of the executing application and is closest to the original floating-point number.

2. The system of claim 1 further comprising a plurality of registers carried by the data processor to store the more than one different floating-point type number conversions.

3. The system of claim 1 wherein at least one of the controller and a user selects the more than one different floating-point type.

4. The system of claim 3 wherein the more than one different floating-point type is selected at least one of prior to conversion, during conversion, and after conversion.

5. The system of claim 1 wherein the controller executes at least one of internal and external to the data processor.

6. The system of claim 1 wherein the more than one different floating-point type number comprises at least one of binary floating-point type number, decimal floating-point type number, and hexadecimal floating-point type number.

7. The system of claim 6 wherein the binary floating-point type number comprises at least one of a short format, a long format, and an extended format;
wherein the decimal floating-point type number comprises at least one of a short format, a long format, and an extended format; and wherein the hexadecimal floating-point type number comprises at least one of a short format, a long format, and an extended format.

8. The system of claim 7 wherein at least one of the controller and a user selects at least one of the short format, the long format, and the extended format for at least one of the binary floating-point type, the decimal floating-point type, and the hexadecimal floating-point type.

9. The system of claim 8 wherein the at least one of the short format, the long format, and the extended format is selected at least one of prior to conversion, during conversion, and after conversion.

10. A method comprising:
configuring an automated controller to convert an original floating-point number to more than one different floating-point type number;
presenting the more than one different floating-point type number to an executing application; and
selecting by the executing application the more than one different floating-point type number that at least one of satisfies the requirements of the executing application and is closest to the original floating-point number.

11. The method of claim 10 further comprising selecting the more than one different floating-point type number via at least one of the controller and a user.

12. The method of claim 10 further comprising selecting the more than one different floating-point type number to be at least one of binary floating-point type, decimal floating-point type, and hexadecimal floating-point type.

13. The method of claim 12 further comprising selecting the binary floating-point type to be at least one of a short format, a long format, and an extended format, the decimal floating-point type to be at least one of a short format, a long format, and an extended format, and the hexadecimal floating-point type to be at least one of a short format, a long format, and an extended format.

14. The method of claim 13 further comprising selecting at least one of the short format, the long format, and the extended format for at least one of the binary floating-point type, the decimal floating-point type, and the hexadecimal floating-point type via at least one of the controller and a user.

15. The method of claim 14 further comprising selecting the at least one of the short format, the long format, and the extended format by at least one of prior to conversion, during conversion, and after conversion.

16. A computer program product to improve numerical conversion, the computer program product comprising:
a non-transitory computer readable storage medium having computer readable program code embodied therewith, the computer readable program code comprising:
computer readable program code configured to configure an automated controller to convert an original floating-point number to more than one different floating-point type number;
computer readable program code configured to present the more than one different floating-point type number to an executing application; and
computer readable program code configured to select by the executing application the more than one different floating-point type number that at least one of satisfies the requirements of the executing application and is closest to the original floating-point number.

17. The computer program product of claim 16 further comprising: computer readable program code configured to select the more than one different floating-point type number via at least one of the controller and a user.

18. The computer program product of claim 16 further comprising: computer readable program code configured to select the more than one different floating-point type number to be at least one of binary floating-point type, decimal floating-point type, and hexadecimal floating-point type.

19. The computer program product of claim 18 further comprising: computer readable program code configured to select the binary floating-point type to be at least one of a short format, a long format, and an extended format, the decimal floating-point type to be at least one of a short format, a long format, and an extended format, and the hexadecimal floating-point type to be at least one of a short format, a long format, and an extended format.

20. The computer program product of claim 19 further comprising: computer readable program code configured to select at least one of the short format, the long format, and the extended format for at least one of the binary floating-point type, the decimal floating-point type, and the hexadecimal floating-point type via at least one of the controller and a user.

* * * * *